(No Model.)

H. FRANK.
MATCH BOX FOR BICYCLES.

No. 597,279. Patented Jan. 11, 1898.

WITNESSES:
Edward Thorpe

INVENTOR
Hilda Frank
BY
ATTORNEYS.

UNITED STATES PATENT OFFICE.

HILDA FRANK, OF NEW YORK, N. Y.

MATCH-BOX FOR BICYCLES.

SPECIFICATION forming part of Letters Patent No. 597,279, dated January 11, 1898.

Application filed August 1, 1896. Renewed June 24, 1897. Serial No. 642,162. (No model.)

*To all whom it may concern:*

Be it known that I, HILDA FRANK, of New York city, in the county and State of New York, have invented a new and Improved Match-Box for Bicycles, of which the following is a full, clear, and exact description.

The object of the invention is to provide a new and improved match-box, more especially designed for attachment to bicycles, to enable the rider to conveniently carry matches for readily lighting and relighting the lamp and for other purposes.

The invention will be fully described hereinafter and defined in the claim.

Reference is to be had to the accompanying drawings, forming a part of this specification, in which similar characters of reference indicate corresponding parts in all the figures.

Figure 1:
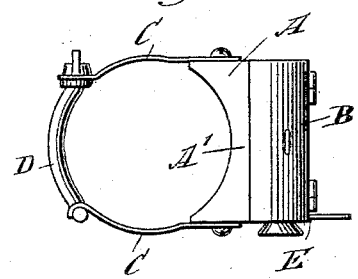
Figure 2:
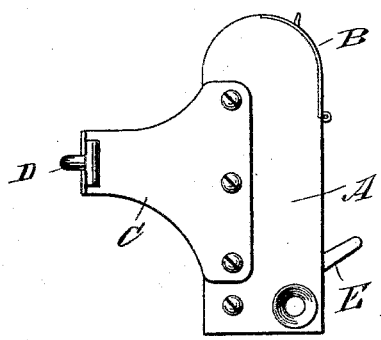
Figure 3:
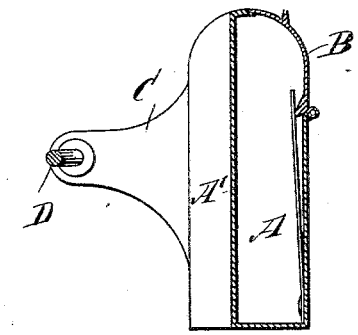

Figure 1 is a plan view of the improvement. Fig. 2 is a side elevation of the same. Fig. 3 is a sectional side elevation of the same, and Fig. 4 is a plan view of a modified form of the improvement.

The improved match-box is provided with a casing A, formed at the front and near the upper end with a spring-pressed cover or lid B, which when open gives access to the matches contained in the casing A. The back A' of the box A is curved to conform to the shape of the steering-head or other part of the bicycle-frame, on which the box is secured by a clip comprising spring side arms C and a curved connecting-bar D, as plainly indicated in the drawings. Thus the back A' is adapted to engage part of the frame of the bicycle and the connecting-bar by fastening the side spring-arms together, which securely attaches the entire box to the bicycle-frame.

The connecting-bar D is preferably made in the form of a bolt, so that when the nut on the bolt is screwed up it tightens the clip to securely fasten the box in place and prevent rattling.

Figure 4:
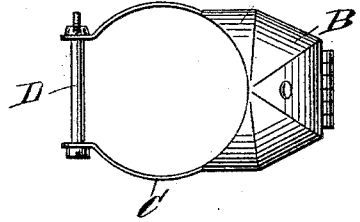

Various forms may be given to the box, as indicated in Figs. 1 and 4, and the clip-arms C may be secured to the sides of the box A' or formed integrally therewith, as desired.

The cover or lid B is preferably made to overlap the casing, so as to prevent rainwater or the like from passing into the interior of the casing.

It will be seen that when the match-box is filled with matches then the rider of the bicycle is enabled at any time to light the lamp or to light a tobacco-pipe, cigar, or the like. If desired, a cigar-cutter E of any approved construction may be attached to the casing A, as illustrated in Figs. 1 and 2.

Having thus fully described my invention, I claim as new and desire to secure by Letters Patent—

In a match-box for bicycles, a safe with a curved rear face, two spring-arms projecting rearwardly from the sides of the safe and curved outward in continuation with the curve of the rear side of the safe, and a curved bolt connecting the rear ends of the spring-arms and curved in continuation with the curves aforesaid, substantially as described.

HILDA FRANK.

Witnesses:
 THEO. G. HOSTER,
 A. A. HOPKINS.